Sept. 27, 1938.  A. L. STOWELL  2,131,695
INSIDE WIND COILABLE MEASURING RULE
Filed May 15, 1935  2 Sheets-Sheet 1
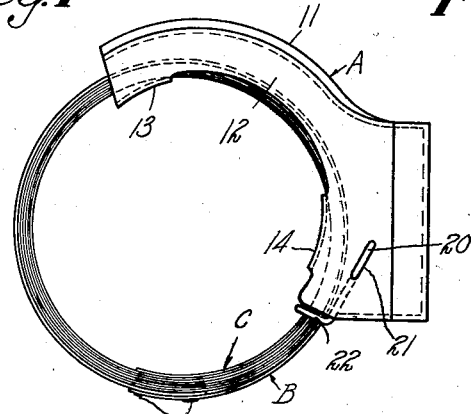
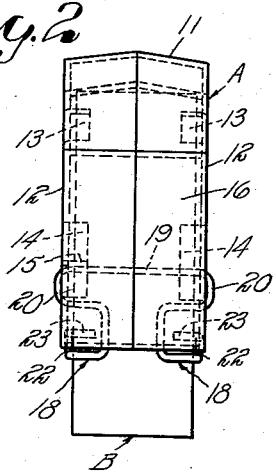
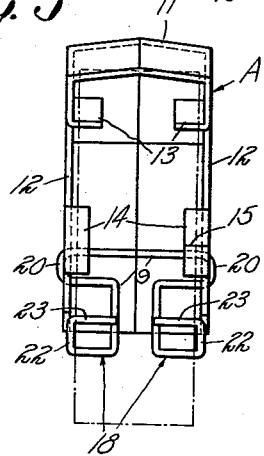
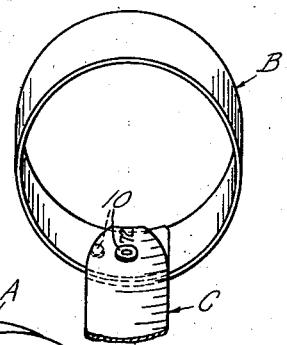
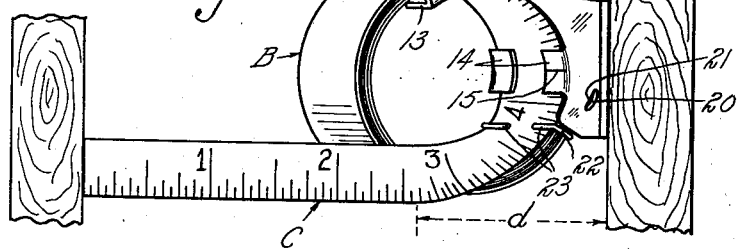
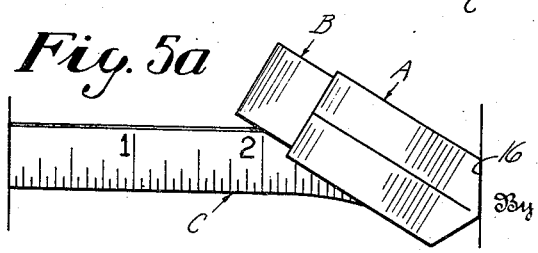
Inventor
Austin L. Stowell
By T. Clay Lindsey
Attorney Sept. 27, 1938. A. L. STOWELL 2,131,695
INSIDE WIND COILABLE MEASURING RULE
Filed May 15, 1935 2 Sheets-Sheet 2
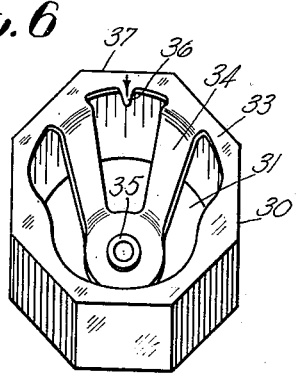
Fig. 6
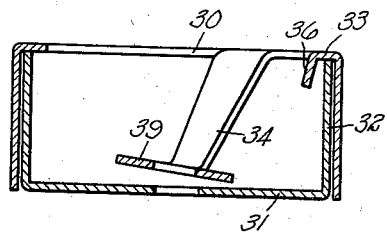
Fig. 8
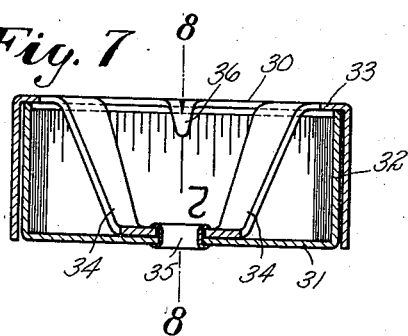
Fig. 7
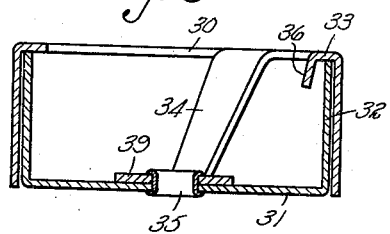
Fig. 9
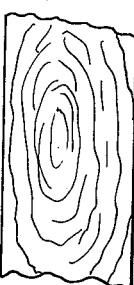
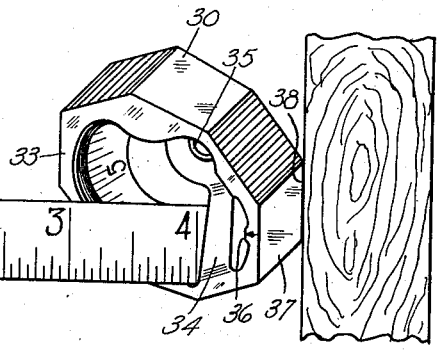
Fig. 10
Inventor
Austin L. Stowell
By W. Clay Lindsey
Attorney Patented Sept. 27, 1938

2,131,695

UNITED STATES PATENT OFFICE 2,131,695

INSIDE WIND COILABLE MEASURING RULE

Austin L. Stowell, New Britain, Conn., assignor to The Stanley Works, New Britain, Conn., a corporation of Connecticut Application May 15, 1935, Serial No. 21,549

12 Claims. (Cl. 33—138)

This invention relates to coilable measuring devices of the so-called "inside wind" type disclosed in the United States patent to Hiram A. Farrand No. 1,402,589 dated January 3d, 1922, and wherein is embodied a measuring device including a resilient metallic ribbon or tape of transverse curvature and having an inherent tendency to assume a straight or rod-like form, and a holder in which the resilient tape is adapted to be coiled in such manner as to permit uncoiling of the tape from its inner end.

An aim of the present invention is to provide an improved rule of this character by means of which direct and accurate readings of inside measurements, as well as outside measurements, may be taken with ease and facility.

A further aim of the invention is to provide a coilable measuring device of the inside wind type with means of an improved and simplified character for exerting a constant frictional force or resistance which substantially counterbalances the tendency of the tape to automatically project itself from the holder when its inner end is moved laterally out of the plane of the coiled portion thereof, thereby providing what may be termed a balanced rule in which the measuring tape may be pushed into the casing and pulled out of the casing with a generally uniform action and effort and in which the rule is automatically retained in any desired extended position.

A still further aim of the invention is to provide an improved rule of the character described having various features of novelty and advantage and which is characterized by its simplicity in construction, its economy in manufacture, its lightness in weight, its compactness, and the ease and facility with which the same may be employed.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein I have shown, for illustrative purposes, two embodiments which the present invention may take:

Figure 1 is a front view of one form of the device;

Fig. 2 is a side or edge view thereof;

Fig. 3 is a view looking at the inner side of the frame or casing;

Fig. 4 is a perspective view of the ring within which the tape is adapted to be wound, the inner end of the tape being illustrated;

Fig. 5 is a perspective view showing the structure in use for taking an inside measurement;

Fig. 5a is a top plan view of the device as shown in Fig. 5;

Fig. 6 is a perspective view of another form of the device.

Fig. 7 is a transverse sectional view through the device shown in Fig. 6;

Fig. 8 is a sectional view taken on line 8—8 of Fig. 7 and showing the casing and cup before the two are secured together;

Fig. 9 is a view similar to Fig. 8 but illustrating the parts connected together by an eyelet; and Fig. 10 is a perspective view showing the device of the second embodiment in use for taking an inside measurement.

Referring to the drawings in detail, and, more particularly, to the embodiment shown in Figs. 1 to 5a, A denotes a casing or frame which rotatably supports a ring or circular holder B within which the tape or rule proper C is adapted to be coiled, the successive convolutions of the coil being formed one within the other as the tape is pushed into the holder. The measuring tape C is of the character described in said Farrand patent, that is, it is in the form of a metallic ribbon of concavo-convex cross section and having sufficient flexibility to permit of its being coiled or rolled and being of sufficient stiffness and resiliency to assume and retain a straight, rod-like condition when permitted to do so. Provided on the concave face of the tape is the usual scale.

The ring or holder B may be of suitable construction but, by way of illustration and in the interest of economy, it is shown in the embodiment of Figs. 1 to 5a as comprising a ring formed from a thin metal strip, the ends of which are overlapped and secured together by rivets 10. The inner end of the tape is pivoted to this ring, as by means of one of the rivets 10. In this embodiment, the casing or frame A is in the form of a section or part of a ring which extends but partially about the holder B. This casing is preferably formed of sheet metal and has a circular channel for accommodating the holder and the coiled tape within the holder. More particularly, the frame is shown as having an external peripheral wall 11 and side walls 12, the latter being in straddling relation to that portion of the ring or holder located within the casing. The edges of the side walls, adjacent one end thereof, are provided with opposed inturned ears or lugs 13 which extend into the holder. Adjacent the other end of these walls are similar opposed lugs 14 which also extend into the holder. Obviously, the lugs 13 and 14 serve the purpose of partially closing the parti-circular channel within the casing and thereby prevent the ring and coil therein from becoming detached from the casing. One of the lugs 14 is provided with an index mark 15, by means of which direct readings of inside measurements may be taken. When the free end of the tape is pulled out of the coil, it will assume a rod-like state, and this extended portion is substantially tangential to the coil from which it has been drawn and is at an angle laterally to the plane of the holder. The peripheral wall of the casing adjacent the entrance end thereof (i. e., the lower end, as viewed in Fig. 1), is angular in cross section to provide a flat abutment or surface 16 which is disposed at right angles to the line of tangency between the extended portion of the tape and the coiled portion thereof. The abutting face 16 is transversely inclined to the plane of the ring B in accordance with the angle between that ring and the extended portion of the tape. Thus the extended portion of the tape is substantially perpendicular to the plane of this surface 16. The perpendicular distance from the plane of this abutting surface to the point at which the extended portion of the tape changes from a curved to a straight edge (this distance being indicated generally by the letter $d$) is equal to the length of that portion of the tape between that point to a point in registry with the index mark 15. Thus, with this arrangement, when it is desired to take an inside measurement, as shown in Figs. 5 and 5a, the face 16 of the casing is abutted flatwise against one of the opposing faces the distance between which is to be determined, and the inner or free end of the tape is drawn out until it engages the other opposing surface. The distance between these opposing surfaces may now be determined by merely reading the scale mark on the tape which is in registry with the index mark 15. Thus, a direct reading may be very easily and quickly taken.

When the free or inner end of the tape is displaced laterally out of the plane of the coil, the tape, due to its transverse curvature, has a tendency to uncoil and project itself out of the casing, as described in said Farrand patent. While this action may be desirable in some instances, it is objectionable in that it may result in personal injury and injury to the rule itself. In order to overcome this objectionable feature of inside wind rules as heretofore constructed, I provide an improved, constantly-acting brake for exerting a fixed frictional force against the opposite edges of the rule, the friction being such as to counterbalance the tendency of the rule to shoot out. This results in an inside wind rule of a balanced character and wherein the rule may be pulled out of and pushed into the casing with a uniform easy effort, and the rule will be maintained in any desired extended position. In the embodiment shown in Figs. 1 to 5a, this brake is in the form of a spring wire bent to provide a pair of opposed spring fingers 18 which straddle the coil and bear against the side edges thereof. The spring has a transverse portion 19 provided at its ends with return bends 20 which fit into slots 21 in the side walls of the casing adjacent the entrance or lower end thereof. The fingers extend from the inner ends of these bent portions and have hooked portions which receive the opposite side edges of the ring B and the coiled tape therein. The radially extending portions 22 of these fingers press against the side edges of the coiled tape, and the terminal ends 23 of the fingers project into the opening within the coiled portion of the tape. It is clear that these fingers normally tend to spring towards each other and thereby frictionally engage the side edges of the tape and thus produce a braking action which prevents free rotation of the ring. The friction or resistance exerted is such that it counterbalances, as nearly as practical, the tendency of the rule to assume a rectilinear shape and thus prevent the rule from shooting out of the casing. The hooked ends of the fingers also serve as guides for the tape as it is fed into and withdrawn from the coil.

Referring now to the embodiment shown in Figs. 6 to 10, inclusive, the frame is illustrated as being in the form of an octagonal casing 30 within which is rotatably mounted a cup 31, the circular wall 32 of which constitutes a ring within which the concavo-convex resilient tape is adapted to be wound with each successive convolution nested within the preceding one. In this instance, the casing 30 has a flange 33 at its front end from which extends a pair of spring arms which form a bridge 34 to the cross portion 39 of which the bottom of the cup is rotatably connected as by means of an eyelet 35. Also extending from this flange and inwardly of the coiled tape is an index mark 36 by means of which direct readings of inside measurements may be taken. This index mark is located midway between the ends of the flat face 37 of the casing. This flat face provides an abutment or edge 38 at the rear of the casing and this edge is adapted to be engaged against one of the opposed surfaces, the distance between which is to be determined. This edge 38 is substantially perpendicular to the line of tangency of the extended portion of the tape to the coiled portion thereof and has the same relation to the tape and the index mark 36 as has the flat abutting surface 16 of the preceding embodiment.

In this embodiment of the invention, the upper edge of the cup is resiliently urged against the flange 33 of the casing in order to effect a braking action and thus produce an inside wind rule of a balanced character. As in the preceding embodiment, the resistance exerted is such that it counterbalances, as nearly as possible, the tendency of the rule to assume a rectilinear state and thus prevent the rule from shooting out of the casing. By preference, the cup is frictionally urged against the casing by employing the inherent resiliency of the arms 34. It will be noted from Fig. 8 that, when the cup is inserted in the casing and before the eyelet is fastened in place, the portion 39 of the bridge or arms is spaced somewhat from the bottom of the cup and is tipped up somewhat. When the eyelet is fastened in place, the cross portion is drawn down against the bottom of the cup and the arms are flexed, thereby causing the upper edge of the cup to be urged against and frictionally engage the flange 33 of the casing.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a coilable measuring device of the inside wind type, a resilient ribbon tape of concavo-convex cross section and having a tendency to assume a rectilinear state, a holder for maintaining said tape in an annular coiled condition and in which each successive convolution is coiled within the preceding one, and a casing rotatably supporting said holder and the coiled portion of the tape, said tape having a scale and said casing being in the form of a parti-cylindrical ring having an external wall and side walls forming an internal curved channel for peripherally and frictionally accommodating the holder and the coiled portion of the tape, said casing having on the inner edges of said side walls inturned lugs projecting into the opening within the holder.

2. In a coilable measuring device of the inside wind type, a resilient ribbon tape of concavo-convex cross section and having a tendency to assume a rectilinear state, a holder for maintaining said tape in an annular coiled condition and in which each successive convolution is coiled within the preceding one, a casing rotatably supporting said holder and the coiled portion of the tape, and braking means engaging and exerting against the opposite side edges of the coiled portion of the tape a constant, fixed frictional force which substantially counterbalances the tendency of the tape to project itself from the coil when the inner end of the tape is moved laterally out of the coil.

3. In a coilable measuring device of the inside wind type, a resilient ribbon tape of concavo-convex cross section and having a tendency to assume a rectilinear state, a holder for maintaining said tape in an annular coiled condition and in which each successive convolution is coiled within the preceding one, a casing rotatably supporting said holder and the coiled portion of the tape, and braking means associated with the casing and having a pair of spring members straddling the holder and the coiled portion of the tape and pressing against the side edges thereof, said members having a constant, fixed frictional pressure which substantially counterbalances the tendency of the tape to project itself from the casing when the inner end thereof is moved laterally from the casing whereby to provide a substantially balanced device.

4. In a coilable measuring device of the inside wind type, a resilient ribbon tape of concavo-convex cross section and having a tendency to assume a rectilinear state, a holder for maintaining said tape in an annular coiled condition and in which each successive convolution is coiled within the preceding one, a casing rotatably and peripherally supporting said holder and the coiled portion of the tape, and braking means associated with the casing and comprising a pair of oppositely disposed spring fingers straddling the holder and substantially surrounding the coiled portion of the tape and engaging and pressing against the side edges thereof, said spring fingers exerting a frictional force which substantially counterbalances the tendency of the tape to project itself from the holder when the free end of the tape is moved laterally from the holder and convolutions of the tape.

5. In a coilable measuring device of the inside wind type, a resilient ribbon tape of concavo-convex cross section and having a tendency to assume a rectilinear state, a holder comprising a cup for maintaining said tape in an annular coiled condition and in which each successive convolution is coiled within the preceding one, a casing rotatably supporting said cup and the coiled portion of the tape, said casing having a resilient arm extending into said cup, and means for rotatably connecting the bottom of said cup to said arm, said arm being under tension to urge the edge of said cup against the casing to effect a constant frictional force therebetween which substantially counterbalances the tendency of the tape to project itself from the coil when the inner end of the tape is moved laterally out of the coil.

6. In a coilable measuring device of the inside wind type, a resilient ribbon tape of concavo-convex cross section and having a tendency to assume a rectilinear state, a holder comprising a cup for maintaining said tape in an annular coiled condition and in which each successive convolution is coiled within the preceding one, a casing in which said cup is rotatably mounted and having an inturned flange against which the edge of the peripheral wall of the cup is adapted to engage, said casing having, extending from said flange and into said cup, a bridge comprising a pair of resilient arms and a connecting portion at the inner ends of the arms, and means for rotatably connecting the bottom of the cup to said connecting portion of the bridge, said arms being under tension whereby the edge of the cup is urged against said flange with a constant fixed frictional force which substantially counterbalances the tendency of the tape to project itself from the coil when the inner end of the tape is moved laterally out of the coil.

7. In a coilable measuring device of the inside wind type, a resilient ribbon tape of concavo-convex cross section and having a tendency to assume a rectilinear state, a holder for maintaining said tape in an annular coiled condition and in which each successive convolution is coiled within the preceding one, a casing comprising a part-cylindrical ring-shaped member havng an external wall and side walls forming a channel for accommodating said holder and the coiled portion of the tape, said side walls having aligned slots adjacent the entrance end of said casing, and a combined brake and guide comprising a spring wire having a central transverse portion with return bends at its ends engaging in the slots in said side walls and hooked fingers extending from the return bends and straddling the opposite side edges of said holder and the coiled portion of the tape therein, said fingers exerting a substantially constant fixed pressure against the side edges of said holder and tape for substantially counterbalancing the tendency of the tape to uncoil itself from the holder when the inner end of the tape is moved laterally of the holder.

8. In a coilable measuring device of the inside wind type, a resilient ribbon tape of concavo-convex cross section and having a tendency to assume a rectilinear state, a scale on the tape, an annular holder within which the tape is adapted to be internally coiled with each successive convolution coilably received within the preceding one, a parti-cylindrical rigid casing peripherally supporting the holder for rotation therein, means on the casing loosely embracing an arcuate portion of the holder and tape and constraining the tape to emerge from the casing at a predetermined position, an index on the casing and cooperating with the scale on the tape, and an external abutment on the casing having a substantially flat surface disposed in a plane substantially at right angles to a longitudinal portion of the tape when withdrawn from the casing, the perpendicular distance from said abutment surface to the extended end of the tape being accurately indicated on the portion of the scale aligned with the index.

9. In a coilable measuring device, a resiliently flexible measuring tape having a concavo-convex cross section and a tendency to assume a rectilinear state, a measuring scale on said tape, an annular holder within which the tape may be internally coiled so that each successive convolution is coiled within the preceding one, a rigid casing rotatably supporting the holder and the coiled portion of the tape, and means on the casing overlying the coiled portion of the tape and limiting its egress from the casing to a predetermined position, and a lug on the casing overlying the coiled portion of the tape and having an index cooperating with the scale; said casing being provided with an external abutment disposed in a plane perpendicular to the portion of the tape when extended from the casing; the perpendicular distance from said plane to the end of said extended tape portion being indicated by said index on said scale.

10. In a coilable measuring device, a resiliently flexible measuring tape having a concavo-convex cross section and tending to assume a rectilinear state, a measuring scale on the tape, a holder having a cylindrical wall against which the tape may be internally coiled with each successive convolution received within the preceding one, a rigid casing rotatably supporting said holder and provided with spaced arms overlying the holder and extending within the coiled portion of the tape; one of said arms limiting the point of egress of the tape from the holder at a predetermined position, and a lug on the casing extending into the holder in spaced overlying relation with the coiled portion of the tape; said lug being provided with an index cooperating with said scale; the casing also having an external abutment adjacent said lug and disposed at right angles to and located in a plane perpendicular to the extended portion of the tape; the perpendicular distance between said plane and the extended tape end being indicated by the index on said scale.

11. In a coilable measuring device of the inside wind type, a resilient ribbon tape of concavo-convex cross section and tending to assume a rectilinear state, a measuring scale on said tape, a holder for receiving and maintaining the tape in an annular coiled form with each successive convolution within the preceding one, and a rigid casing for the holder in the form of a particircular ring; said casing having a channel peripherally supporting the holder for rotation therein.

12. In a coilable measuring device of the inside wind type, a resilient ribbon tape having a concavo-convex cross section and tending to assume a rectilinear state, said tape having a measuring scale, a holder for receiving and maintaining the tape in an annular coiled condition wherein each successive convolution of the tape is coiled within the preceding one, and a particylindrical casing having an external wall and side walls forming an internal curved channel for frictionally receiving and rotatably supporting the holder and coiled portion of the tape; the channel portion of said casing being provided with spaced inturned lugs overlying the coiled portion of the tape and the holder.

AUSTIN L. STOWELL.